United States Patent [19]

Wang

[11] Patent Number: 5,800,853

[45] Date of Patent: *Sep. 1, 1998

[54] BAKING PAN KIT AND ASSOCIATED METHOD

[76] Inventor: Ping Wang, 420 Mills Dr., Benicia, Calif. 94510

[*] Notice: The term of this patent shall not extend beyond the expiration date of Pat. No. 5,776,532.

[21] Appl. No.: 884,345

[22] Filed: Jun. 27, 1997

Related U.S. Application Data

[63] Continuation-in-part of Ser. No. 681,113, Jul. 22, 1996.

[51] Int. Cl.$^6$ ............................................. A23L 1/10
[52] U.S. Cl. ........................ 426/511; 426/498; 426/505; 426/506; 99/324; 99/339
[58] Field of Search ................... 99/234, 339; 426/505, 426/498, 506, 511

[56] References Cited

U.S. PATENT DOCUMENTS

| | | | |
|---|---|---|---|
| 3,735,749 | 5/1973 | Binks et al. | |
| 3,794,016 | 2/1974 | Binks et al. | 126/369 |
| 3,889,582 | 6/1975 | Binks et al. | |
| 3,972,318 | 8/1976 | Lenoir | 126/348 |
| 4,092,909 | 6/1978 | Phillips | 99/444 |
| 5,503,063 | 4/1996 | Sebald | 99/447 |
| 5,680,956 | 10/1997 | Woodward et al. | 220/607 |

*Primary Examiner*—Jeffrey Stucker
*Attorney, Agent, or Firm*—R. Neil Sudol; Henry D. Coleman

[57] ABSTRACT

A baking pan kit includes a lower pan portion and an upper pan portion removably connected to the lower pan portion via a effectively steam-proof seal, the upper pan portion having an upper surface provided with an opening. The upper surface has an area surrounding the opening which is continuous and free of perforations. A plurality of panels are alternatively connectable to the upper pan portion over the opening. At least one of the panels is provided with a plurality of perforations disposed in a predetermined array, the one panel being connectable to the upper pan portion in an essentially steam-proof seal to define, with the lower pan portion and the upper pan portion, a substantially sealed chamber with the perforations communicating with the chamber.

22 Claims, 9 Drawing Sheets

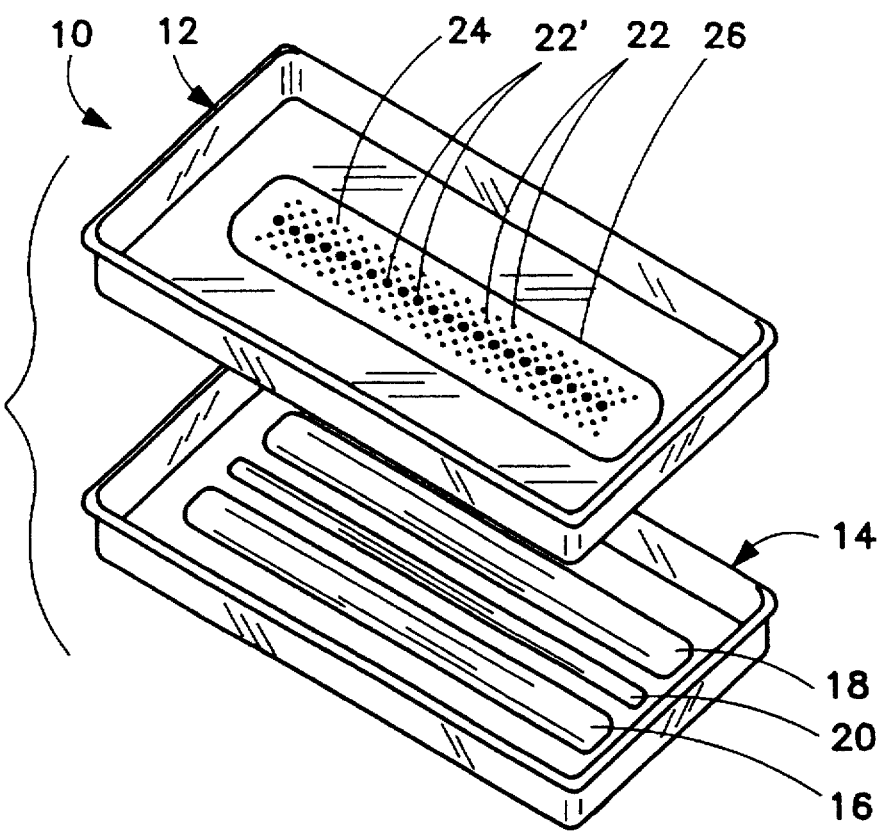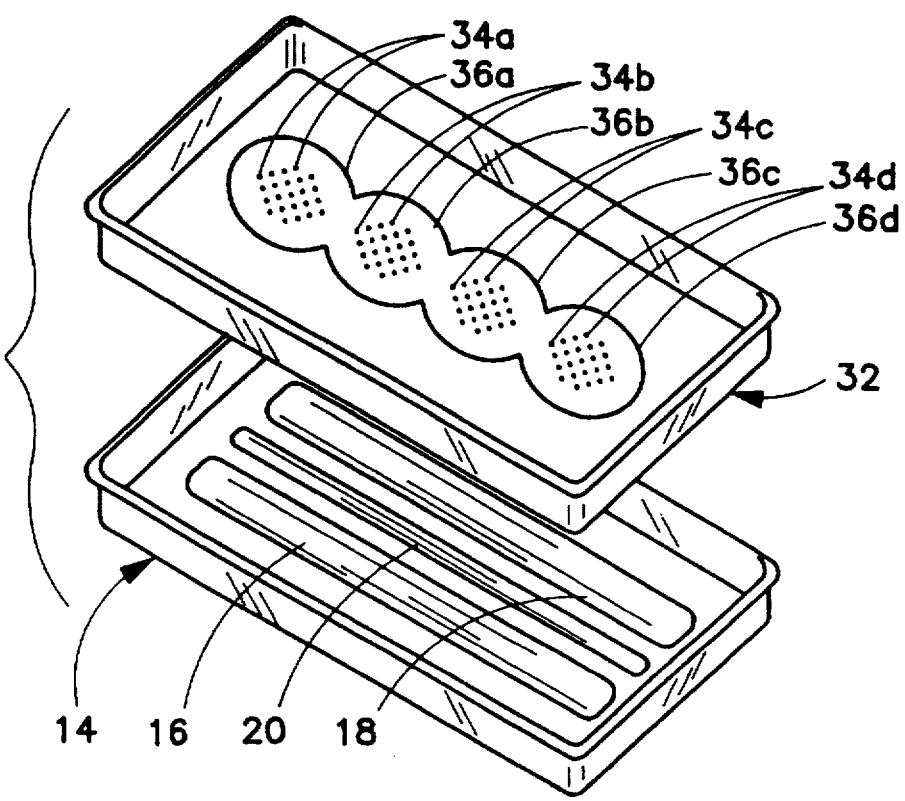

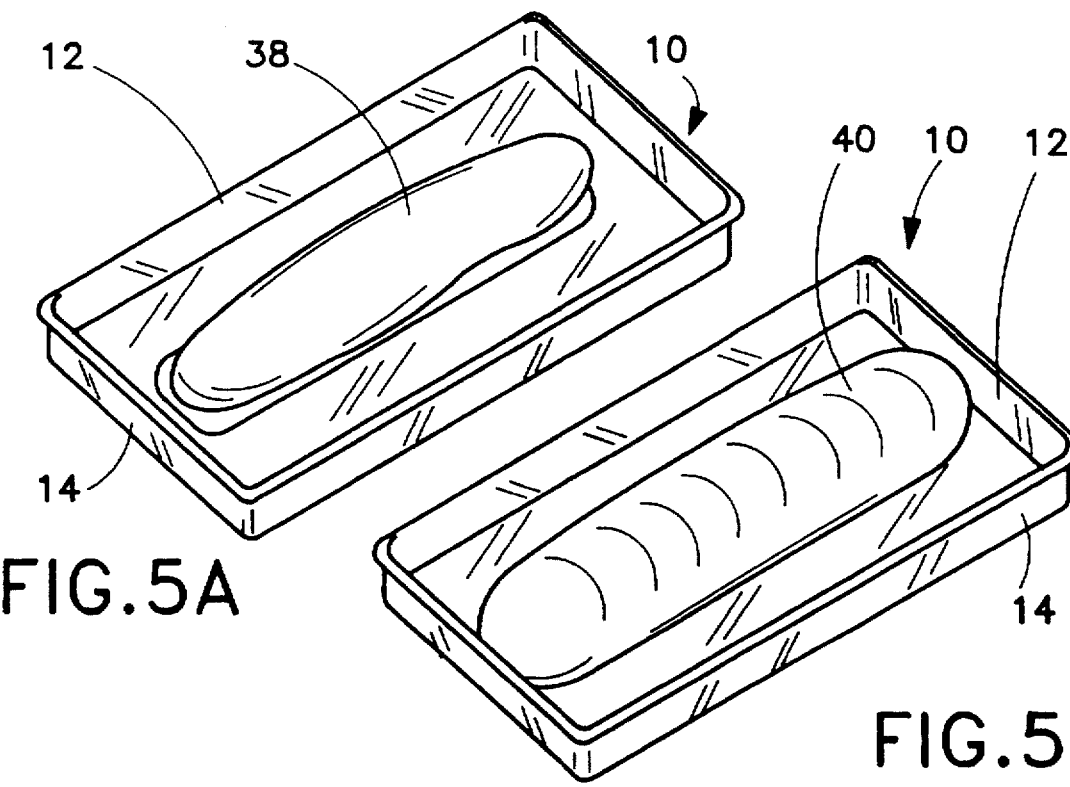
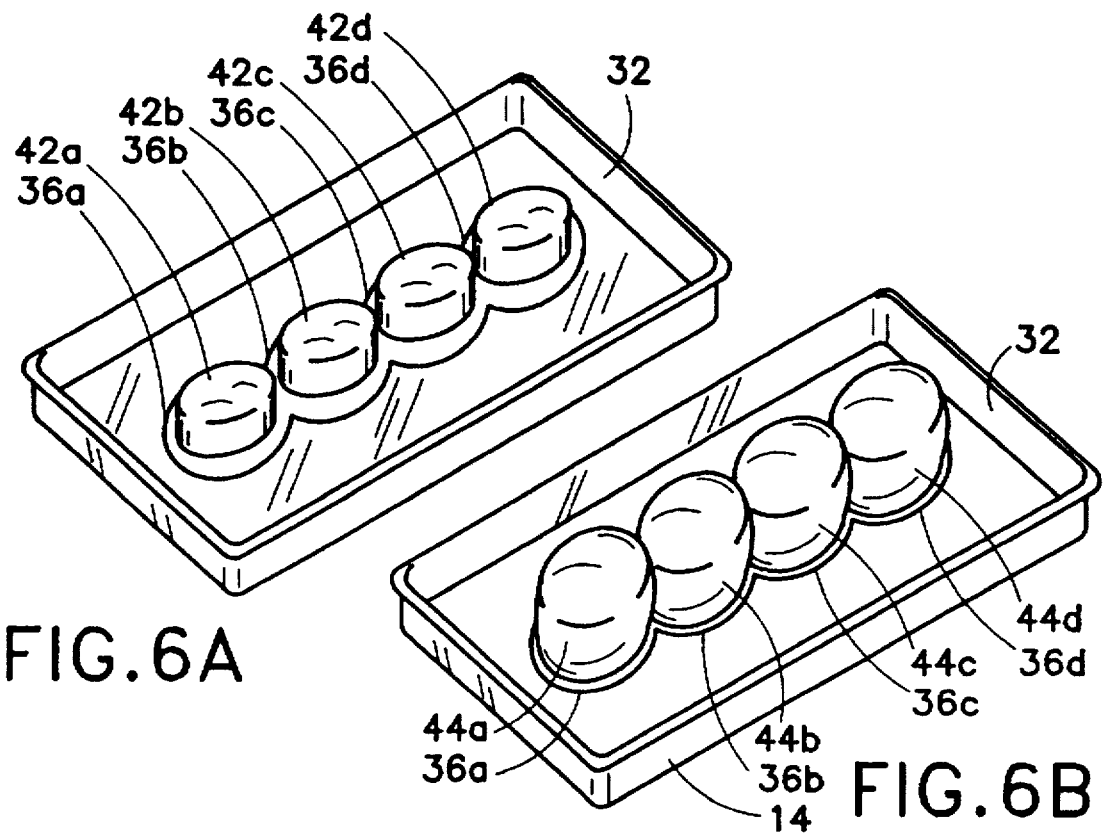

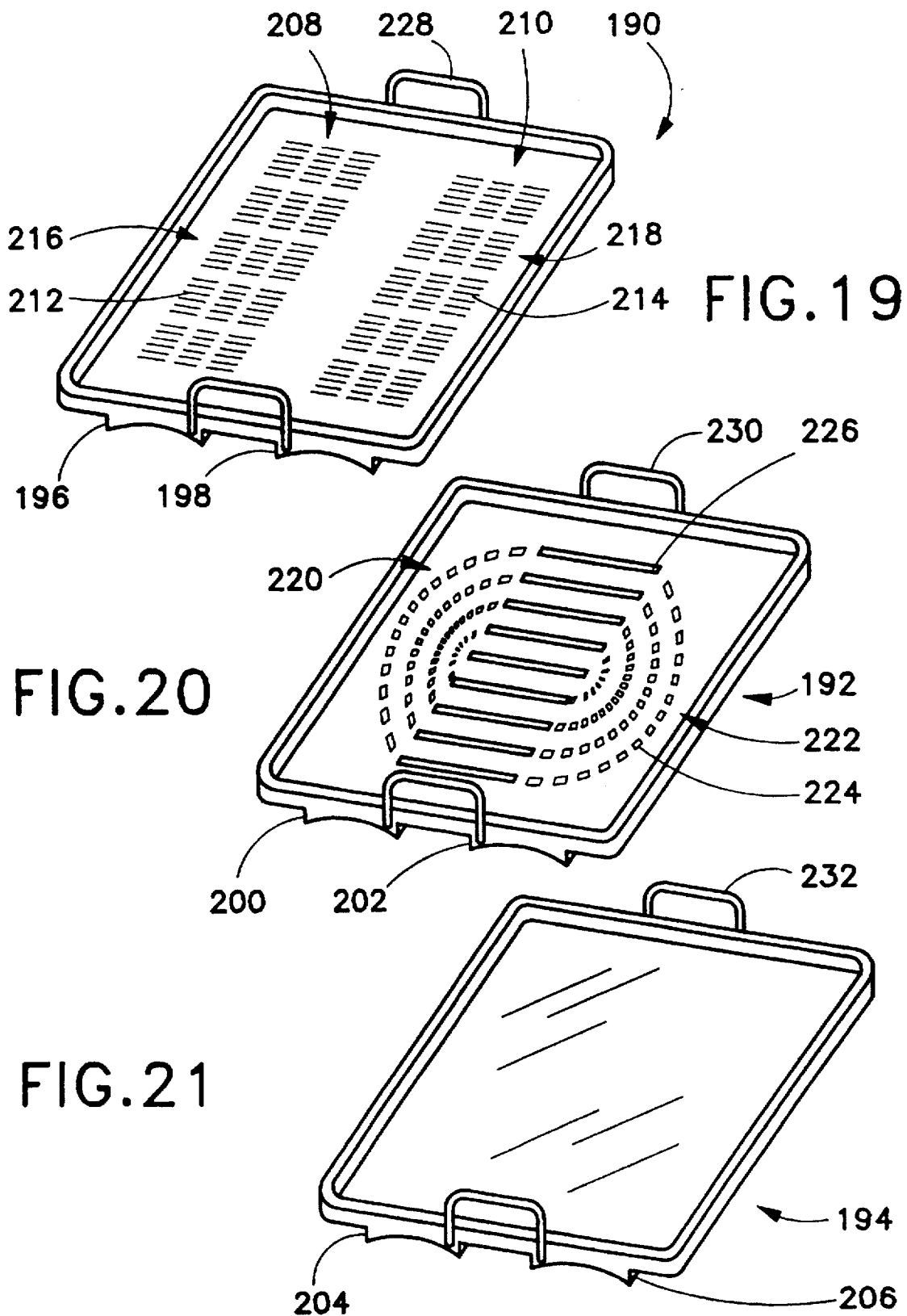

5,800,853

BAKING PAN KIT AND ASSOCIATED METHOD

CROSS-REFERENCE TO RELATED APPLICATION

This application is a continuation-in-part of Application Ser. No. 08/681,113 filed Jul. 22, 1996.

BACKGROUND OF THE INVENTION

This invention relates to a baking pan kit. This invention also relates to a method for baking bread, rolls and other foodstuffs.

Bread and baked dough products are among the most popular foods in the western world and have been increasingly popular in Asia. Being able to manipulate the quality of a baked dough product is a major challenge and an extremely important task to the food industry. The final quality of a baked dough product is determined by its texture, color and flavor profile.

The baking of a baked dough product involves the development of a pre-proofed (either yeast or chemical leavened) dough to a desired raw specific volume, shaping the dough to a pre-determined geometry and weight, placing the dough on (or in) a baking pan, and then baking at a constant temperature (350–380° F.) for a period of time until the surface of the dough reaches a golden brown color.

Traditional metal baking pans or sheets suffer several disadvantages when used for baking bread (especially French bread) and other baked dough products. Due to the difference in the heat transfer rate between the bottom surface of the dough and the rest of the dough, the bottom layer (or crust) of the baked product is normally overheated so that the color is darker than the desired golden brown. In addition, the bottom surface of the baked product has an undesired burned flavor which has developed by the time the top surface turns golden brown.

Traditionally, the final baked specific volume of a baked dough product usually does not reach the maximum attainable volume due to the crust formation that restricts the volume expansion of the interior region. The volume expansion and crust formation are controlled by the heat and mass transfer characteristics of the baking process. Therefore, the baked specific volume is significantly affected by the baking parameters such as oven temperature and air velocity. Since the texture property of a baked dough product is strongly dependent upon the baked specific volume, it is necessary to control and unify the baked specific volume. Under most baking conditions, it is often desirable to have a baked specific volume that is as large as possible.

The texture property of a baked dough product is determined by not only the baked specific volume but also the homogeneity of the pore size distribution. It has been known that the pore size distribution is affected by the simultaneous heat and mass transfer during baking. Sometimes extremely large holes, at the consumption of many small holes, are developed in a baked dough product. In this situation, even though the baked specific volume is large enough, the overall quality of the baked dough product can be quite low.

The phenomenon of burgeon is very common in a baked dough product. Burgeon is related to (1) differences in the rate of crust formation and the rate of heat transfer to the interior of a baked dough product; and (2) the thickness and toughness of the crust. Under most baking conditions, the crust has been developed before the center (interior) reaches the starch gelatinization temperature because of thermal lag.

If the crust is strong or the crust has a high elastic module, it will restrict additional volume expansion even when the center temperature is increased, thereby resulting in a low baked specific volume as mentioned in a previous paragraph. The additional volume expansion from the interior region when the temperature is further increased can break the crust when there is a weak point on the crust. Burgeon would cause irregular and undesired shapes of a baked dough product.

Since the baking time is normally determined by the color of the surface, it is possible to have an undercooked region near the geometric center of a baked dough product when (1) the oven temperature and air velocity are set too high; and (2) the dough geometry and size are not appropriated controlled. The doughy interior would result in a low baked specific volume because the interior has not been properly baked (cooked) with a resulting undesired texture property of the finished product.

The flavor profile also plays a very important role in determining the final quality of a baked dough product. It is generally recognized that steaming of a baked dough product prior to baking leads to a finished product with better and more desirable flavor characteristics. In order to enhance and manipulate the flavor of a baked dough product, one or more flavor compounds are commonly blended into the dough during mixing. However, being able to manipulate the flavor of a pre-mixed refrigerate dough product or frozen dough product is not an easy task.

SUMMARY OF THE INVENTION

An object of the present invention is to provide a baking pan kit with a versatility and interchangeability of parts which enables multifarious alternative uses in steaming and baking different kinds of foodstuffs.

A more specific object of the present invention is to provide such a baking pan kit which permits and facilitates use of an improved cooking method, for example, a baking method which results in a larger baked dough product with the same raw specific volume, which produces a baked dough product having a more even degree of crust browning, and in which burgeon is reduced.

A further object of the present invention is to provide such a baking pan kit which facilitates the introduction of enhanced and more easily modified flavor characteristics into baked food products, including but not limited to baked dough products.

An additional object of the present invention is to provide a baking method which utilizes the baking pan kit of the invention.

These and other objects of the present invention will be apparent from the descriptions and illustrations provided herein.

A baking pan kit comprises, in accordance with the present invention, a lower pan portion and an upper pan portion removably connected to the lower pan portion via a effectively steam-proof seal, the upper pan portion having an upper surface provided with an opening. The upper surface has an area surrounding the opening which is continuous and free of perforations. A plurality of panels are alternatively connectable to the upper pan portion over the opening. At least one of the panels is provided with a plurality of perforations disposed in a predetermined array, the one panel being connectable to the upper pan portion in an essentially steam-proof seal to define, with the lower pan portion and the upper pan portion, a substantially sealed chamber with the perforations communicating with the chamber.

A baking pan kit in accordance with the invention optimizes versatility and convenience. The baking kit is ready adaptable to steaming or baking different kinds of foodstuffs.

A cooking method in accordance with the present invention utilizes a baking pan kit as described above. The baking pan kit is assembled by coupling the upper pan portion to the lower pan portion, disposing a predetermined amount of water in the lower pan portion, and connecting the one of the panels to the upper pan portion over the opening to thereby define a substantially sealed chamber with the perforations communicating with the chamber. A food article is disposed on the one panel so that the food article substantially covers all of the perforations. The assembled baking pan kit together with the food article on the one of the panels is moved into a heated enclosure. After placement of the assembled baking pan kit and the food article in the heated enclosure, steam is generated from the water in the chamber and the steam is delivered, for a first limited period of time, from the chamber through the perforations to a lower surface of the food article. Upon completion of the delivery of steam to the food article, the food article is subjected to conventional baking only for a second limited period of time.

A baking pan kit in accordance with the present invention preferably consists of at least three pieces, combines the effects and advantages of steaming and baking to optimize and control the baking of baked dough products such as bread, buns, rolls, biscuits and etc. so that higher product qualities and special effects can be achieved. The interior of a finished baked dough product is soft, fluffy and moisture while the crust is crispy. It can be applied to any product that requires soft and moist interior and crispy crust. By introducing appropriate flavor agents (water or oil soluble) in the steam generation chamber of the baking pan during baking, the flavor profiles of a finished product can be easily manipulated. It can be used in household electrical and gas ovens as well as industrial baking tunnels.

The lower pan portion of the baking pan kit is preferably provided with water and flavor recesses (volume, pattern and depth are product dependent). The lower pan portion is designed to be able to absorb heat from a oven as soon as possible to vaporize water. It can be made of aluminum, stainless steel, copper or alloys. The perforated panel on which dough products and other food articles can be placed is made of stainless steel or a non-sticky metal. Alternatively, the perforated panel may be made of cast iron which, by virtue of its weight, facilitates the formation of an adequate seal along the junction or area of contact between the perforated panel and the upper pan portion.

The patterns (size, shape, geometry) of the array of perforations depend upon the type of food article or, more specifically, dough product which is to be cooked using the baking pan kit. For example, an elongate array of perforations is suitable for bread or meat loaf, whereas several relatively small arrays of perforations are advantageous for the baking of smaller food items such as biscuits, bread rolls, egg rolls, dumplings, etc.

There several possible mechanisms to couple the bottom and upper pan portions, for instance, by inserting the upper pan portion into the grooves of the bottom pan portion or by simply clamping the upper pan portion onto the bottom pan portion. Generally, it is contemplated that the upper pan portion and the lower pan portion are connected to one another in an effectively steam-proof seal. This seal at least retards steam from escaping the steam-generating chamber via the joint between the upper pan portion and the lower pan portion. Similarly, the panels alternately connectable to the upper pan portion over the opening therein form an effectively steam-proof seal at the joint between the panels and the upper pan portion.

A known amount of water is added into the water recesses in the lower pan portion before usage. The recesses may be provided with depth or dosage markers to indicate desired water volume. The amount of water is product and load dependent. A desired flavor agent (liquid or powder either in bags or small aluminum pans) may be placed in a dedicated flavoring recess. The upper and bottom pan portions are combined generally after the disposition of the water and flavoring into the recesses in the lower pan portion. The assembly of the baking pan kit may or may not require pre-heating. Besides baking, the kit can also be used in:

1. roasting; the bottom pan portion can hold the drips.
2. steaming and baking of vegetables.
3. steaming; to be used with a transparent cover made of CORNING™ ware.
4. cooking; to be used on stoves directly.
5. defrosting and thawing; the bottom pan portion can hold the drips; the defrosting and thawing rate are faster since the surface area is larger.
6. regular baking; it behaves as a regular baking pan (or sheet) by introducing a non-perforated upper pan portion. The air gap between the upper and bottom pan portions reduces the heat transfer rate so that overheating of the bottom of a baked dough product can be avoided.

The panels provided with the kit are preferably adapted to the various uses. For example, one panel may be provided with a relatively high sidewall which receiving the transparent cover for steaming vegetables and other food items. Another panel may be imperforate for regular baking as in the baking of cookies.

Therefore, a baking pan kit in accordance with the invention is a multi-purposed pan that can replace a majority of existing baking pans.

The cooking method utilizing the baking pan kit of the present invention essentially comprises delivering a controlled amount of steam to a lower surface of a food article during an initial part of a baking process. The steam is delivered through the perforations in the panel attached to the upper pan portion over the opening therein. Upon completion of the delivery of steam to the food article, the food article is subjected to conventional baking only for a second limited period of time.

The following discussion is confined primarily to the baking of dough products inasmuch as the invention is believed to have particular advantages in the baking of dough products. However, it is to be appreciated that the method is applicable to other foodstuffs, as well.

In utilizing the baking pan kit of the invention, it is especially advantageous if a piece of dough is deposited on the panel so that the dough covers substantially all of the perforations. This method serves to produce a moister, fresher tasting bread product. The steam fed to the interior of the dough assists in the cooking of piece of dough along the inside thereof. The crust is still formed, but the center is moister.

The perforations are small so that dough does not fall into the perforations. Moreover, the smallness of the perforations facilitates the generation of steam pressure in a chamber below the support surface and increases the velocity of the steam entering the dough through the perforations. The higher velocity in turn increases the distance that the steam can penetrate into the dough.

The steam enhances the raising or expansion of the dough by heating the air and carbon dioxide in the dough and also by converting moisture in the dough to water vapor. The solid portions of the dough itself also expand due to the internal heating. The steam also serves to keep the lower surfaces of the dough wet to allow farther and larger volume expansion that results in a fluffy texture.

Inevitably, during the steaming portion of the baking process, some water vapor escapes from beneath the piece of dough and moistens lateral surfaces of the dough, particularly along approximately the lower quarter of the dough's height. This water vapor is not easily visible to the naked eye but can be detected, for example, by placing a mirrored surface close to the dough. The steam and water vapor thus maintain the lowermost surfaces of the dough in a moist condition and thereby allows them to stretch during the early baking phase (approximately ten minutes or one-third of the total baking time). This contributes to a larger baked product. The moisture applied to the lower surfaces of the dough through the perforations enables expansion of the entire piece of dough by feeding dough from the interior of the dough to the lower surfaces thereof.

The amount of water placed in the lower pan portion should be controlled so that the steam generating phase lasts approximately ten minutes or one-third of the total baking time.

The flavoring composition may include a flavoring agent dispersed or dissolved in water or a cooking oil. Alternatively, the flavoring agent may be placed in the respective recess in powered form.

The baking pan kit of the present invention an offers the following advantages in terms of the quality of a baked dough product over the conventional metal baking pans and sheets:

(1) higher baked specific volume; there is a 5–30% increase in the baked specific volume of a finished product depending on the formulation; for French bread, the baked specific volume obtained using a new baking pan kit is roughly 20–25% higher than that of a conventional baking pan.

(2) more uniform pore size distribution; extreme large pores can be avoided when the new baking pan kit is used.

(3) a more uniform, stable and reproducible shape and appearance; burgeon can also be avoided by using the new baking pan kit.

(4) more uniform color distribution of the crust; excess crust and dark brown color formation at the bottom crust can be avoided.

(5) less sensitive to the baking parameters such as the oven temperature and air velocity; the undercooked region can be avoided when the oven temperature is unintentionally set too high using the new baking pan kit.

(6) a different but better and more desirable flavor profile; also, any desired finished flavor profile may be obtained from the same recipe of dough.

(7) softer interior structure of a baked dough product; due to the higher moisture (2–3% higher) of the interior, the baked dough product baked with the new baking pan kit would be softer and fresher than that of the conventional baking pan; the baked dough product is fully expanded, upraised well and the bread crumb is softer and fluffier.

(8) a 20–100% increase in shelf life for the similar product quality.

BRIEF DESCRIPTION OF THE DRAWINGS

FIG. 1 is an exploded perspective view of a baking pan, showing an upper pan portion and a lower pan portion of the baking pan.

FIG. 2 is an exploded perspective view of a modified baking pan, showing an upper pan portion and a lower pan portion similar to those shown in FIG. 1.

FIGS. 5A and 5B are perspective views of the baking pan of FIG. 1, showing an elongate piece of dough and a corresponding baked loaf of bread, respectively, positioned on the pan.

FIGS. 6A and 6B are perspective views of the baking pan of FIG. 2, respectively showing four pieces of dough and corresponding baked rolls or buns placed on the baking pan.

FIGS. 15–21 and 23 show respective baking pan parts utilizable with the upper pan portion and the lower pan portion of FIG. 13, to enable the cooking of different kinds of foodstuffs pursuant to different baking and/or steaming processes.

FIG. 15 is a schematic isometric view of a first baking pan panel connectable to the upper pan portion of FIG. 13 so as to essentially cover one of the openings thereof FIG. 16 is a schematic isometric view of a second baking pan panel connectable to the upper pan portion of FIG. 13 so as to essentially cover one of the openings thereof FIG. 17 is a schematic isometric view of a third baking pan panel connectable to the upper pan portion of FIG. 13 so as to essentially cover one of the openings thereof FIG. 18 is a schematic isometric view of a casserole-type baking pan part connectable to the upper pan portion of FIG. 13 so as to essentially cover one of the openings thereof.

FIG. 19 is a schematic isometric view of a baking pan panel connectable to the upper pan portion of FIG. 13 so as to essentially cover both of the openings thereof.

FIG. 20 is a schematic isometric view of a further baking pan panel connectable to the upper pan portion of FIG. 13 so as to essentially cover both of the openings thereof.

FIG. 21 is a schematic isometric view of yet another baking pan panel connectable to the upper pan portion of FIG. 13 so as to essentially cover both of the openings thereof.

FIG. 23 is a diagram of a steamer-type pan part connectable to the upper pan portion of FIG. 13 so as to essentially cover both of the openings thereof

DESCRIPTION OF THE PREFERRED EMBODIMENTS

Figure 3:
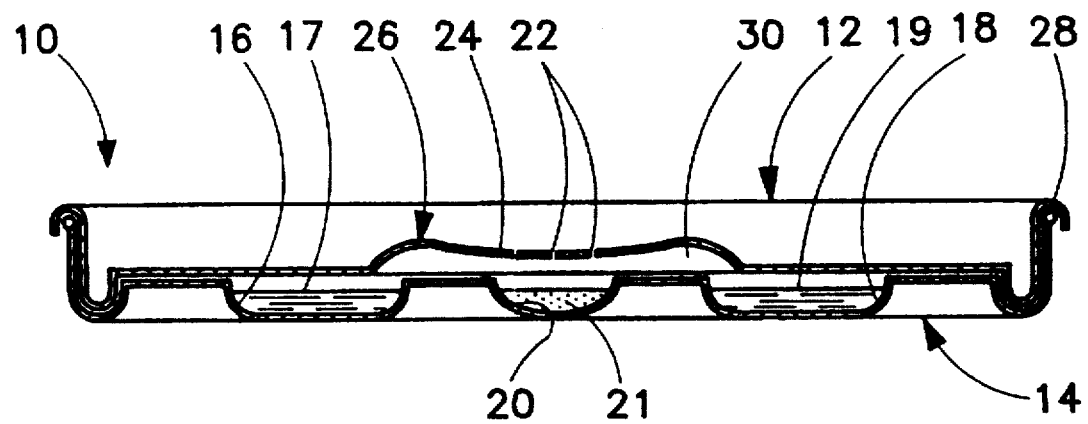
FIG. 3 is a schematic transverse cross-sectional view of the baking pan of FIG. 1, in an assembled configuration.
Figure 4:
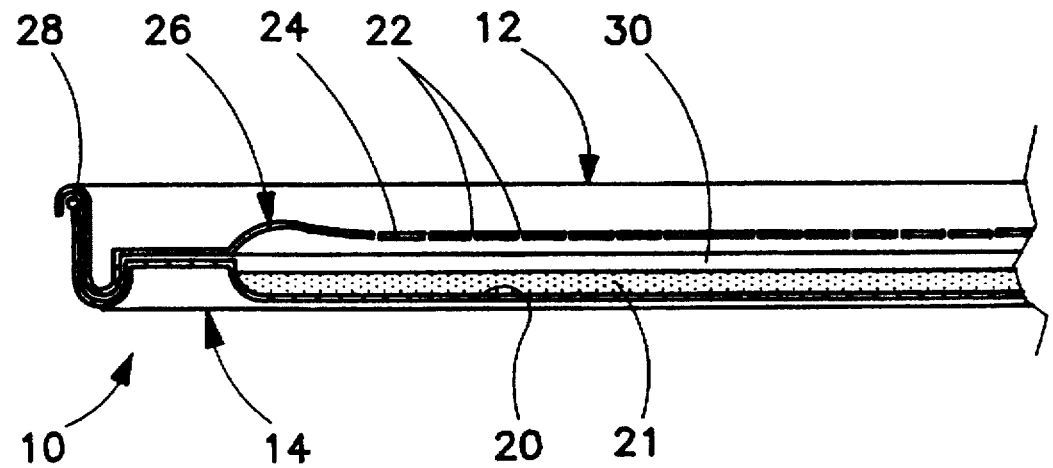
FIG. 4 is a schematic longitudinal cross-sectional view of the baking pan of FIG. 1, in an assembled configuration.

As illustrated in FIGS. 1, 3 and 4, a baking pan 10 comprises an upper pan portion or plate 12 and a lower pan portion or plate 14. Pan portions 12 and 14 can be made of metal such as stainless steel, aluminum, silver coated brass or non-sticky alloys. Lower pan portion 14 has two substantially hemispherical grooves or recesses 16 and 18. Recesses 16 and 18 receive a fixed amount of water 17, 19 (FIG. 3) before baking starts. The depths, diameters and lengths of recesses 16 and 18 may vary in accordance with the intended application, for example, the type and size of the dough product to be baked.

Lower pan portion 14 is also provided with an auxiliary groove or recess 20 for receiving a flavoring composition 21 (FIGS. 3 and 4) which includes a conventional flavoring agent dispersed or dissolved in water or cooking oil or provided in powder form. The flavoring composition 21 may be disposed in recess 20 in prepackaged bags or small aluminum pans (not shown).

Upper pan portion 12 defines a substantially horizontal baking surface provided with a multiplicity of perforations 22 disposed in an array substantially conforming in size and shape to a loaf of bread. As shown particularly in FIGS. 3 and 4, perforations 22 are disposed in an elongate depression 24 formed in an elongate raised portion 26 of upper pan portion 12. As further shown in FIGS. 3 and 4, upper pan portion 12 and lower pan portion 14 are releasably connected to one another along a peripheral bead-and-groove sealing coupling 28. In the assembled configuration of FIGS. 3 and 4, pan portions 12 and 14 define a substantially sealed team generation chamber 30 which communicates with recesses 16, 18 and 20 on a lower side and with perforations 22 on an upper side.

Perforations 22 are mostly very small, on the order of the diameter of a ballpoint pen's writing ball. Perforations 22 must be small enough to prevent dough on upper pan portion 12 from falling into the perforations. Generally, as indicated in the drawings, perforations 22' in the center of the perforation array may be somewhat larger than those at the periphery, to enable a greater flow rate of steam into the center of piece of dough.

FIG. 2 illustrates a modification of the baking pan of FIGS. 1, 3 and 4 wherein upper pan portion 12 is replaced by an upper pan portion 32 having four disk-shaped arrays of perforations 34a, 34b, 34c, 34d disposed in a linear configuration. Perforations 34a, 34b, 34c, 34d may be provided in raised portions 36a, 36b, 36c, 36d of pan portion 32. Again, perforations (not designated) in the central areas of the disk-shaped perforation arrays may be slightly larger (2–3 times as large) than the perforations 34a, 34b, 34c, 34d at the peripheries.

FIGS. 5A and 5B depict two successive stages in the baking of a loaf of bread 40 from an elongate piece of dough 38. After the placement of a predetermined aliquot of water 17, 19 in recesses 16 and 18 (see FIG. 3) and, optionally, the disposition of a flavoring composition 21 in recess 20 (FIGS. 3 and 4), pan portions 12 and 14 are connected to one another. Dough piece 38 is then positioned centrally on an upper surface (not designated) of upper pan portion 12 so that the dough covers essentially all of the perforations. Supporting the dough 38 on its uppermost surface, baking pan 10 is then placed into a heated enclosure or oven having a preselected temperature.

During an initial phase of a baking cycle, steam is generated in chamber 30 and escapes through perforations 22. Steam enters the dough through the perforations 22 and 22', thereby assisting in the cooking of the interior portion of the dough and maintaining the interior dough at an enhanced moisture level. In addition, steam bathes a lower horizontal surface (not designated) of dough 38 and water vapor leaks from between the dough and the upper pan portion to moisten the lower lateral surfaces of dough 38. The escaping water vapor is effective to moisten approximately the lower one-fourth of the lateral surface of dough 38. The moistening of the lower surfaces of dough 38 with steam prevents a browning or hardening of those surfaces during the initial baking phase, thereby enabling a greater degree of dough expansion.

Generally, the amount of water placed into recesses 16 and 18 is just sufficient to generate steam during approximately ten minutes (or about one-third) of a thirty minute baking process. If recesses 16 and 18 can hold a greater amount of water, fill lines (not shown) may be provided to indicate the recommended amount of water to be added for steam generation.

A second phase of the baking process begins when the water in recesses 16 and 18 has been exhausted. During that second phase, the lower surfaces of the bread 40 brown and harden. Because the heat transferred to the dough is greater at the baking pan than along the upper surfaces of the dough, the browning and hardening of the lower surfaces catches up to and substantially matches the browning and hardening of the upper surfaces by the end of the baking process. In any event, because of the delay in the baking of the lowermost, horizontal surface of the dough, that surface is lighter and softer in the final baked loaf 40, in comparison with conventional baking procedures.

FIG. 6A and 6B illustrate the use of the baking pan of FIG. 2 and show upper surfaces of raised portions 36a, 36b, 36c, 36d supporting respective lumps of dough 42a, 42b, 42c, 42d. Again, essentially all perforations 34a, 34b, 34c, and 34d are covered at the beginning of the baking process. The baking process proceeds as discussed above with reference to FIGS. 5A and 5B.

It is to be noted that in the baking pans of FIGS. 1 and 2, recesses 16 and 18 are laterally staggered with respect to raised portion 26 of pan portion 12 and raised portions 36a, 36b, 36c, 36d of pan portion 32. As best seen in FIG. 3, this relative lateral positioning forces the steam generated from water 17 and 19 to flow along a channel between heated surfaces of upper pan portion 12 or 32 and lower pan portion 14 prior to ejection via perforations 22 and 22' or 34a, 34b, 34c, 34d. The heat transfer enabled by this contact between the steam and the heated surfaces of upper pan portion 12 or 32 and lower pan portion 14 superheats the steam and enhances the improved baking process described herein, particularly for chemically leavened dough.

Figure 7A:
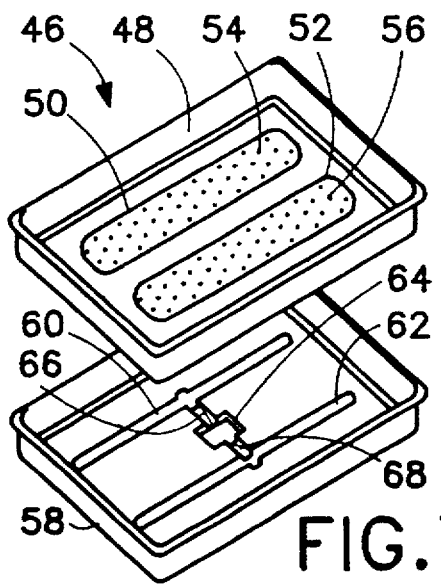
FIGS. 7A–7D show successive steps in the use of another baking pan.
Figure 7B:
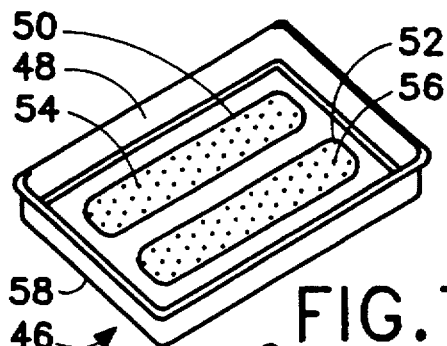

FIGS. 7A–7B illustrate successive steps in a baking process using a modified baking pan 46 which enhances the baking process for yeast leavened dough. As shown in FIGS.

Figure 10:
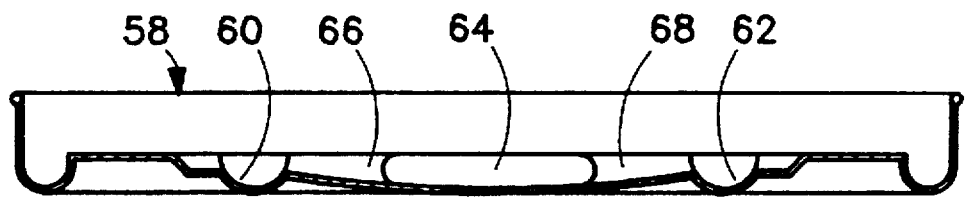
FIG. 10 is a transverse cross-sectional view of a lower pan portion or plate of the baking pan of FIGS. 7A–7B, taken along a geometric center line.
Figure 11:
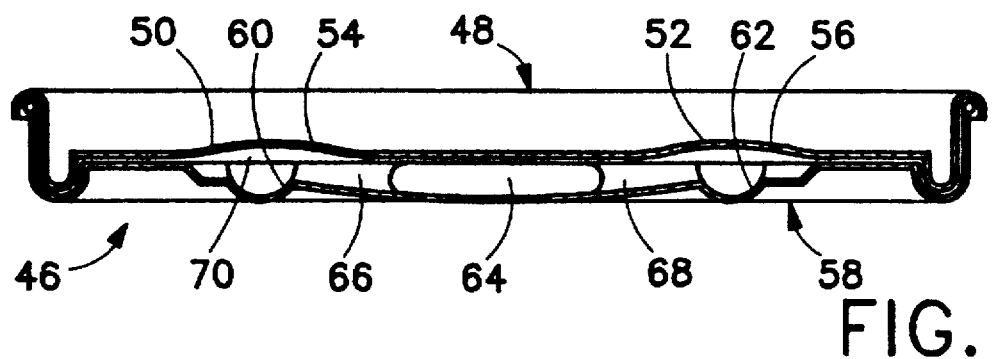
FIG. 11 is a transverse cross-sectional view of the assembled baking pan of FIGS. 7A–7B, taken along a geometric center line.

7A, 7B, 9 and 11, pan 46 includes an upper pan portion or plate 48 having a pair of elongate raised portions 50 and 52 each provided with an elongate array of perforations 54 and 56. Pan 46 also includes a lower pan portion or plate 58 (FIGS. 7A, 10 and 11) having parallel water-receiving grooves or recesses 60 and 62 connected to a central flavoring-receiving recess 64 via respective channels 66 and 68. As shown in FIGS. 7A, 10 and 11, channels 66 and 68 taper from a maximum transverse cross-sectional area at recess 64 to minimum transverse cross-sectional area at recesses 60 and 62.

Figure 7C:
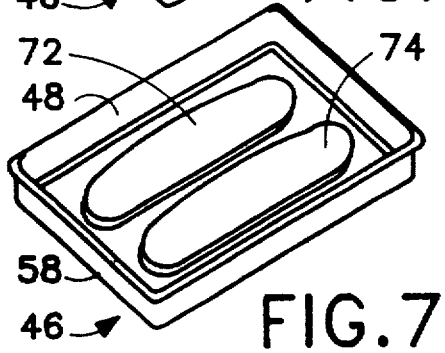
Figure 8C:
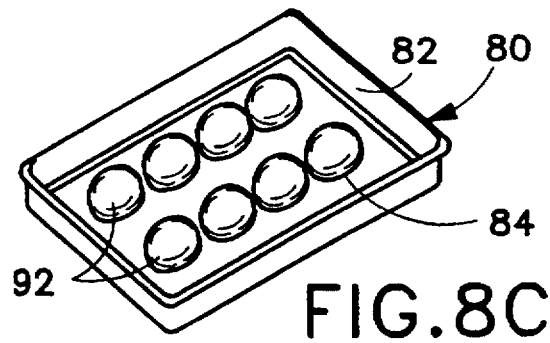
Figure 7D:
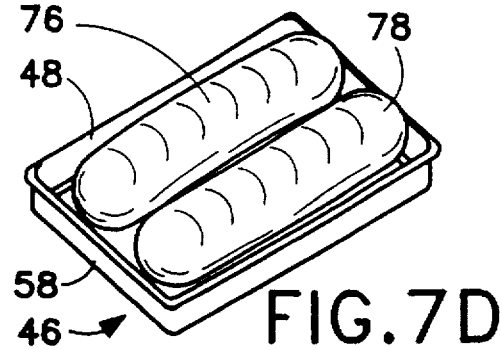

Upon a filling of recesses 60 and 62 with water to predetermined fill levels and upon the optional placement of a flavored composition into recess 64, pan portions 48 and 58 are connected to one another, as illustrated in FIGS. 7B and 11 to define a steam generation chamber 70. Pieces of dough 72 and 74 are placed on upper surfaces (not designated) of raised portions 50 and 52 so that essentially all perforations 54 and 56 are covered, as indicated in FIG. 7C. Baking then proceeds as discussed above with reference to FIGS. 5A and 5B to produce baked loaves 76 and 78 (FIG. 7D).

Channels 66 and 68 are designed so that vaporized flavor compounds can move from recess 64 to recesses 60 and 62, but the water would not flow from recesses 60 and 62 to recess 64.

The upper and lower pan portions of a baking pan as described herein should be connected to one to form an effective steam seal for purposes of guiding steam and vaporized flavor compounds through the perforations provided in the upper pan portion. Generally, the right amount of water is automatically controlled by the capacity of the water-receiving recesses or controlled by the use of fill lines.

Figure 8A:
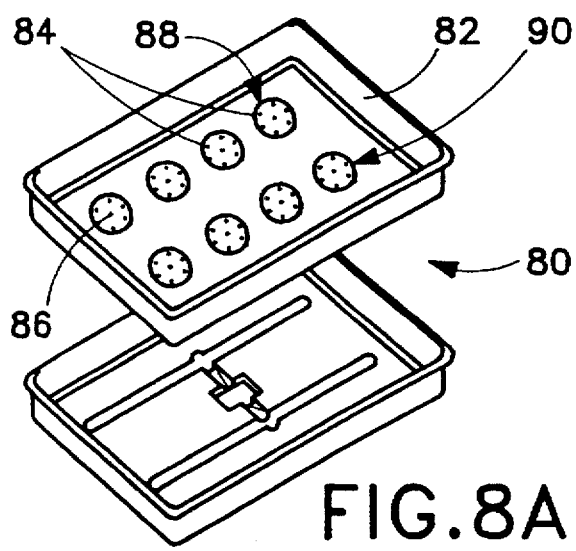
FIGS. 8A–8D show successive steps in the use of yet another baking pan.
Figure 8B:
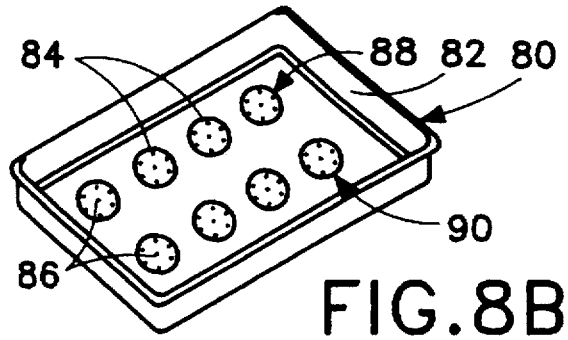
Figure 8D:
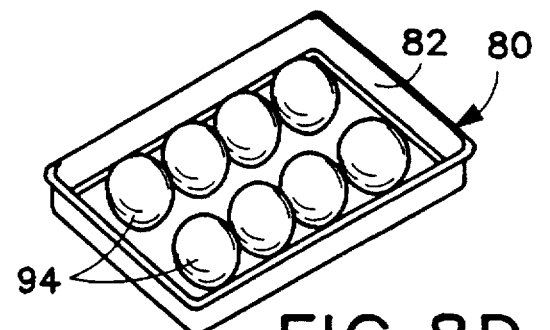
Figure 9:
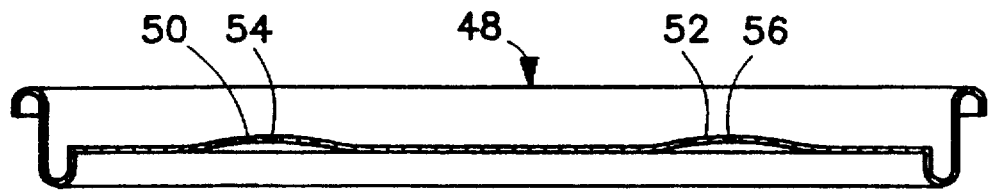
FIG. 9 is a transverse cross-sectional view of an upper pan portion or plate of the baking pan of FIGS. 7A–7B, taken along a geometric center line.

FIGS. 8A–8B illustrate successive steps in a baking process using yet another baking pan 80. Pan 80 is identical to pan 46 except that upper pan portion 48 is replaced by a pan portion 82 having a plurality of circular raised areas 84 provided with perforations 86 and arranged in two linear arrays 88 and 90 over water-receiving recesses 60 and 62. Upon a filling of recesses 60 and 62 with water to predetermined fill levels and upon the optional placement of a flavored composition into recess 64, pan portions 80 and 58 are connected to one another, as illustrated in FIGS. 8B. Pieces of dough 92 are placed on upper surfaces (not designated) of raised areas 84 so that essentially all perforations 86 are covered. Baking then proceeds as discussed above with reference to FIGS. 5A and 5B to produce baked rolls or buns 94 (FIG. 8D).

Figure 12:
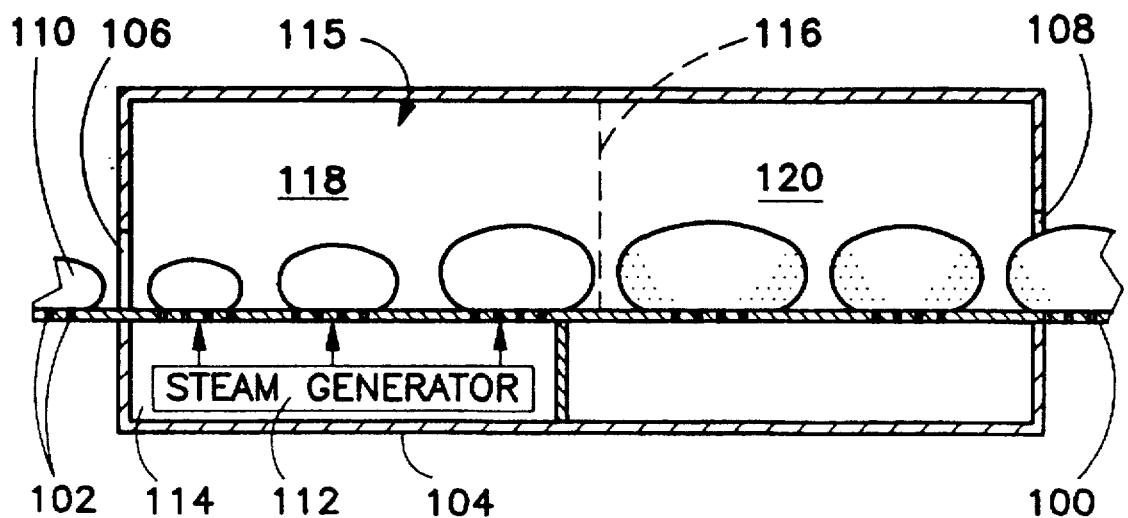
FIG. 12 is a schematic longitudinal cross-sectional view of a continuous-process baking oven.

FIG. 12 illustrates a continuous baking process utilizing principles disclosed above with respect to batch type baking processes. A conveyor 100 with a plurality of interspaced arrays of perforations 102 extends through a heat enclosure or oven 104 from an entrance opening 106 to an exit opening 108. Outside of oven 104, pieces of dough 110 are placed on conveyor 100 over each array of perforations 102 so that essentially all the perforations of each array are covered.

Oven 104 is provided with steam generation means 112 in a steam generation chamber 114 below conveyor 100. Chamber 114 extends continuously along a predetermined distance under conveyor 100, generally along approximately the first one-third of the distance between entrance opening 106 and exit opening 108, thereby providing steam to perforations 102 along that stretch of the conveyor. Oven 104 also has a baking chamber 115 defined along a lower boundary by conveyor 100. A compartmentalizer or divider 116 such as a flexible partition is provided for operatively dividing baking chamber 115 into a more humid first baking zone 118 and an essentially dry second baking zone 120 disposed downstream of the first baking zone. Thus, water vapor enters first baking zone 118 by leaking from beneath the dough pieces 110. As discussed above, this leaking water vapor is effective to moisten only the lower portions of the pieces of dough 110. Steam generation means 112 may comprise a series of spray nozzles which eject an aqueous mist into chamber 114 which is sufficiently heated to convert the water spray into steam.

The functions of steam in a baking process as described hereinabove are:

(1) to provide the interior region with a faster heat transfer rate; the interior can be fully gelatinized and expanded before the crust is developed, and therefore, avoiding undercooking of the interior and resulting a high baked specific volume.

(2) to further increase the baked specific volume through the ballooning effect; since the pressure of steam is higher than the atmospheric pressure, the steam would force the dough to expand in every direction besides the bottom due to the unique curvature of the perforated area of the upper pan.

(3) to retain the moisture of the interior region of a baked dough product; due to the continuous evaporation and condensation of the steam, the interior would retain 2–3% higher moisture content than that baked conventionally. The higher moisture content would keep the finished product softer and fresher for a longer period of time.

(4) to avoid overbaking of the bottom crust; due to the continuous flow of steam when there is water remaining in the water recesses, the bottom temperature is near 212° F. rather than the oven temperature during the early stage of baking. When the water is completely vaporized, the temperature of the baking pan would reach the oven temperature. The combination of low and high temperatures would allow the development of the desired bottom crust without overheating. When too much water is used, the bottom crust might not be formed properly, it is therefore necessary to adjust the amount of water according to the type and size of a dough product.

(5) to provide more uniform pore size distribution and shape of a finished product; since the gelatinization of the starch is completed before the crust is fully developed, burgeon can be avoided.

FIGS. 13–23 together illustrate a baking pan kit having a versatility and interchangeability of parts which enables multifarious alternative uses in steaming and baking different kinds of foodstuffs. The kit comprises a lower pan portion 130 and an upper pan portion 132 illustrated in FIGS. 13 and 14 and further comprises one or more parts illustrated in FIGS. 15–23. These parts provide support surfaces for various foodstuffs and are alternatively connectable to upper pan portion 132 over one or both openings 134 and 136 provided in upper pan portion 132.

Figure 13:
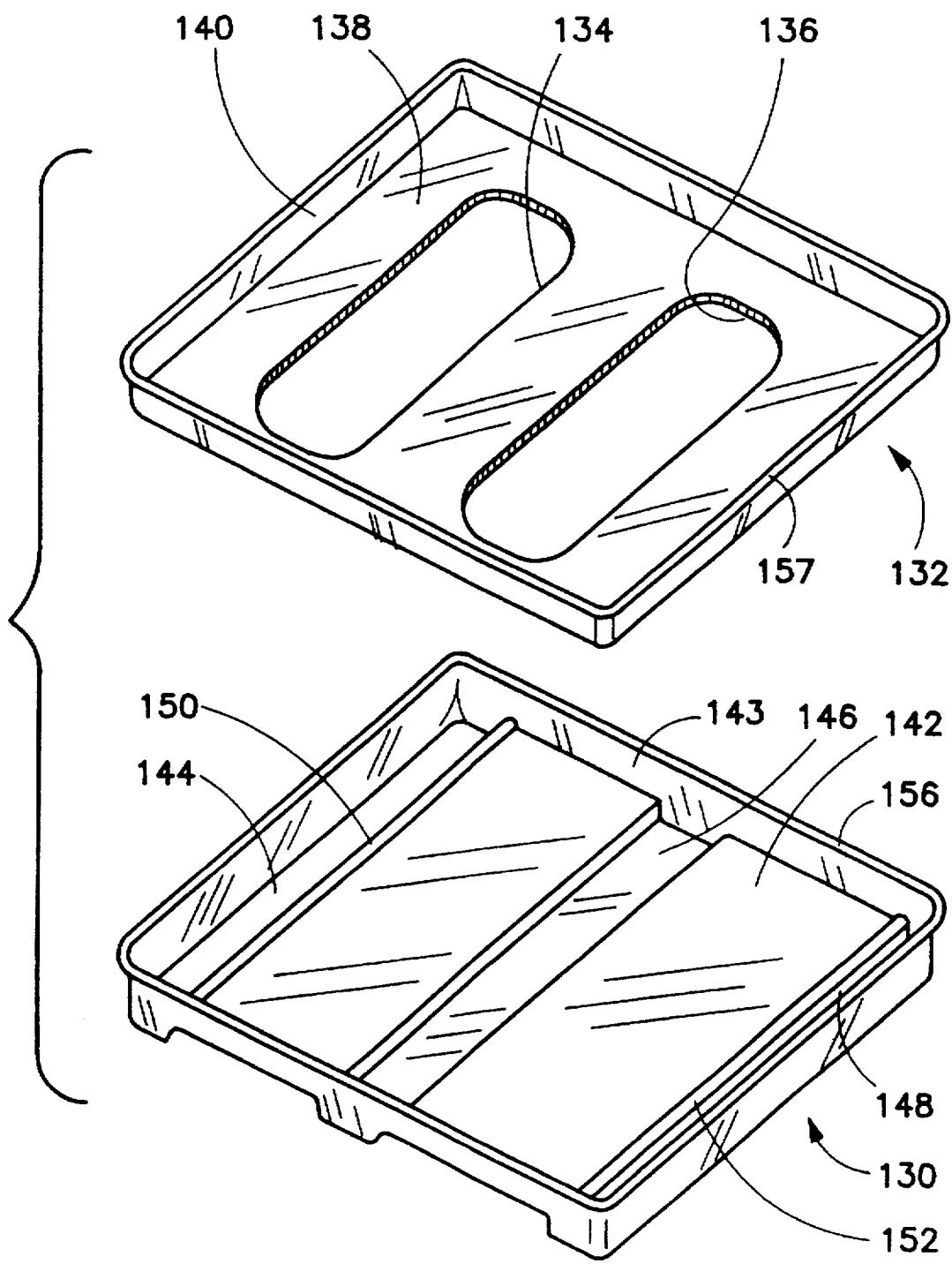
FIG. 13 is an isometric exploded view of two parts of a baking pan kit in accordance with the present invention, showing an upper pan portion with a pair of openings and a lower pan portion with elongate recesses.
Figure 14:
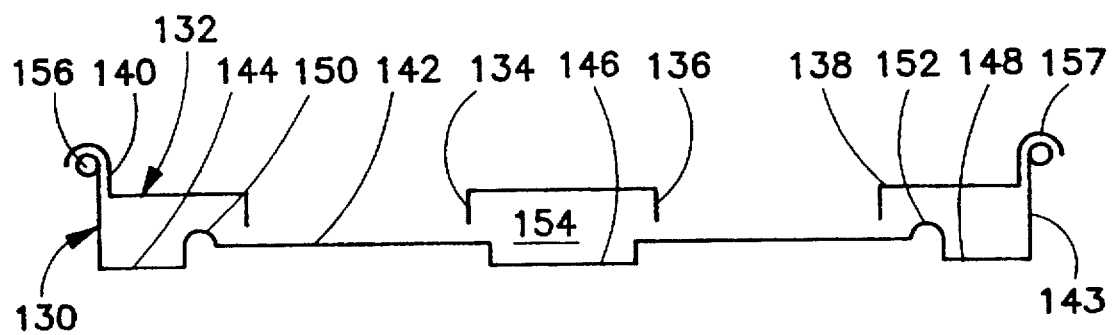
FIG. 14 is a diagram showing the interrelationship of the upper pan portion and the lower pan portion of FIG. 13 in an assembled state.
Figures 15, 16:
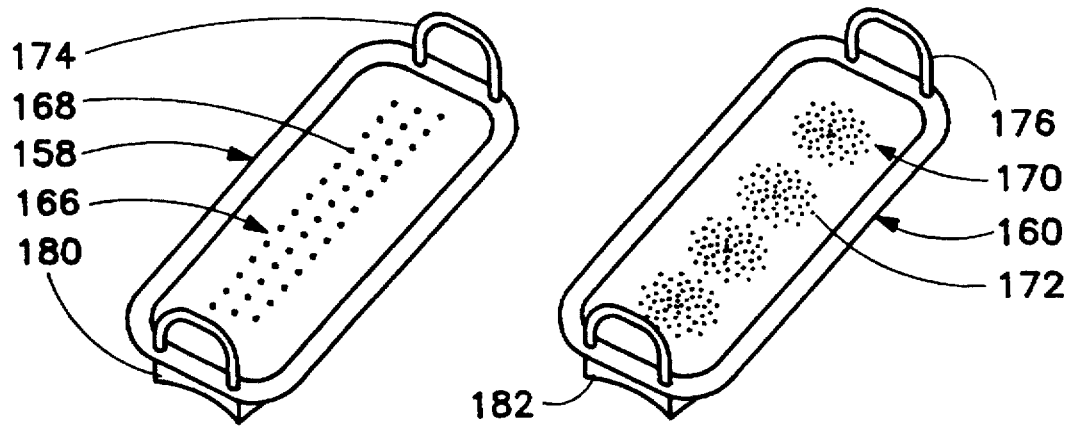
Figures 17, 18:
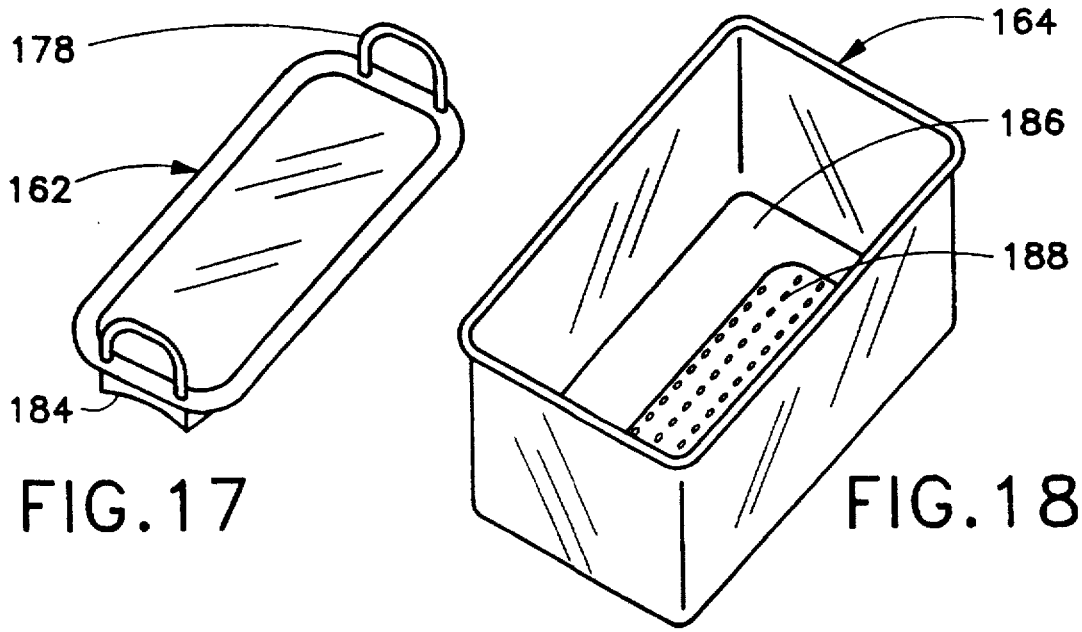

As additionally illustrated in FIGS. 13 and 14, openings 134 and 136 are formed in a plate 138 of upper pan portion 132. Plate 138 is surrounded by an upwardly turned flange 140. Openings 134 and 136 are elongate, generally parallel and surrounded by continuous, imperforate portions of plate 138.

Lower pan portion 130 includes a lower plate 142 surrounded by a perimetral wall 143 and provided with three elongate spaced recesses 144, 146 and 148. Recesses 144, 146 and 148 extend parallel to one another and are laterally staggered relative to openings 134 and 136 when upper pan portion 132 is attached to lower pan portion 130, as depicted schematically in FIG. 14. Plate 142 is formed with elongate beads or ridges 150 and 152 alongside recesses 144 and 148 for deepening those recesses. As discussed hereinabove with reference to recesses 16, 18 and 20, recesses 144 and 148 receive a fixed amount of water before cooking with the baking kit commences. Groove or recess 146 preferentially receives a flavoring composition which includes a conventional flavoring agent dispersed or dissolved in water or cooking oil or provided in powder form. The flavoring composition may be disposed in recess 146 in prepackaged bags or small aluminum pans (not shown). Where flavor additives are not desired, recess 146 may be left empty or provided with water.

Preferably, water (and a flavoring composition) is disposed in recesses 144 and 148 (and 146) prior to an attachment of lower baking pan portion 130 to upper baking pan portion 132, as indicated in FIG. 14. Except for openings 134 and 136, lower pan portion 130 and upper pan portion 132 define a closed steam generation chamber 154. Pan portions 130 and 132 are connected to one another along their peripheries in an effectively steam-proof seal. To that end, perimetral wall 143 is provided with bead 156 which is received in an outwardly extending U- or C-shaped extension 157 of flange 140.

In most cooking operations utilizing the kit of FIGS. 13–23, openings 134 and 136 are blocked by a part illustrated in FIGS. 15–23. This blocking or covering of openings 134 and 136 serves to complete the closure of chamber 154 and facilitate the generation of pressurized steam in that chamber.

FIGS. 15–18 illustrate respective baking kit parts or panels 158, 160, 162, and 164 each of which is connectable to upper pan portion 132 at either opening 134 or 136 in an effectively steam-proof seal. Panel 158 is provided with an elongate array 166 of perforations 168 and is adapted for the steaming and baking of a loaf of bread, while panel 160 is formed with a plurality of generally oval arrays 170 of perforations 172 and is adapted for the steam baking of several biscuits, rolls, muffin, etc. Panel 162 is a solid plate and is used either for merely closing an opening 134 or 136 or for providing a flat surface for certain types of baking procedures, e.g., for the baking of cookies. Each panel 158, 160, and 162 is provided with handles 174, 176, and 178 for facilitating manipulation and with a downwardly facing projection 180, 182 and 184 which alternatively fits into openings 134 and 136 in an effectively steam-proof seal.

Baking kit part 164 takes the form of a meat-loaf baking pan provided in a lower wall or panel 186 with a multiplicity of perforations 188 in a closed spaced array. Lower wall or panel 186 is provided with a projection similar to projections 180, 182 and 184 for mating with opening 134 or 136 in an effectively steam-proof seal.

FIGS. 19–21 illustrate respective baking kit parts or panels 190, 192, and 194 each of which is connectable to upper pan portion 132 at both openings 134 and 136 in an effectively steam-proof seal. Projections 196 and 198 on a lower side of panel 190 mate with openings 134 and 136, respectively, in a effectively steam-tight fit. Similarly, projections 200 and 202 are provided on a bottom surface of panel 192 for fitting in a sealing manner into openings 134 and 136, respectively. Panel 194 has projections 204 and 206 receivable in openings 134 and 136 in steam-proof fits.

Panel 190 is provided with two rows 208 and 210 of perforations 212 and 214. The perforations 212 and 214 are arranged in spaced, generally rectangular arrays 216 and 218 in each row 208 and 210. Rows 208 and 210 are coextensive with openings 134 and 136 when panel 190 is disposed on upper pan portion 132. Panel 190 is useful for cooking foodstuffs such as egg rolls, elongate biscuits or dough products with fillings.

Panel 192 has two circular sections 220 and 222 of perforations 224 disposable over openings 134 and 136 in upper pan portion 132. Panel 192 is further provided with a plurality of spaced, parallel grooves 226 extending from perforations 224 in one section 220 to perforations in the other section 222. Panel 192 enables the delivery of steam to the lower surface of a disk of dough as in a pizza.

Panel 194 is a solid plate and is used for providing a flat surface for certain types of baking procedures, e.g., for the baking of cookies. In this case, no water is deposited into recesses 144, 146, or 148 prior to the assembly of lower pan portion 130 and upper pan portion 132 to one another. The sealed chamber 154 formed by lower pan portion 130, upper pan portion 132, and panel 194 serves as a thermally insulating space which reduces the transfer of heat to the lower surfaces of dough pieces placed on panel 194, thereby preventing the overcooking or burning of the cookies.

Panels 190, 192, and 194 provided with handles 228, 230, and 232 for facilitating manipulation.

Figure 22:
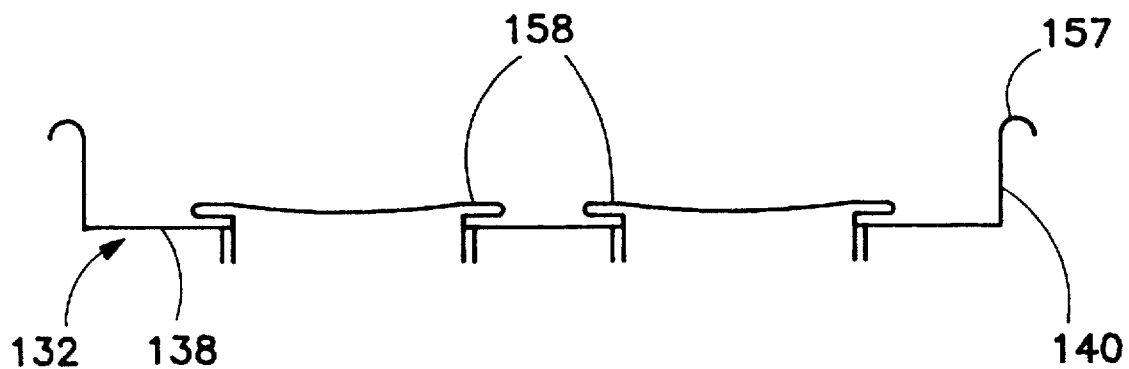
FIG. 22 is a diagram showing two baking pan panels as shown in FIG. 15 connected to the upper pan portion of FIGS. 13 and 14.

FIG. 22 depicts two baking pan panels 158 (FIG. 15) connected to upper pan portion 132 of FIGS. 13 and 14. Panels 158 are formed with depressions, as concave surfaces, as discussed hereinabove with reference to FIGS. 3 and 4 (see reference designation 24).

Figure 23:
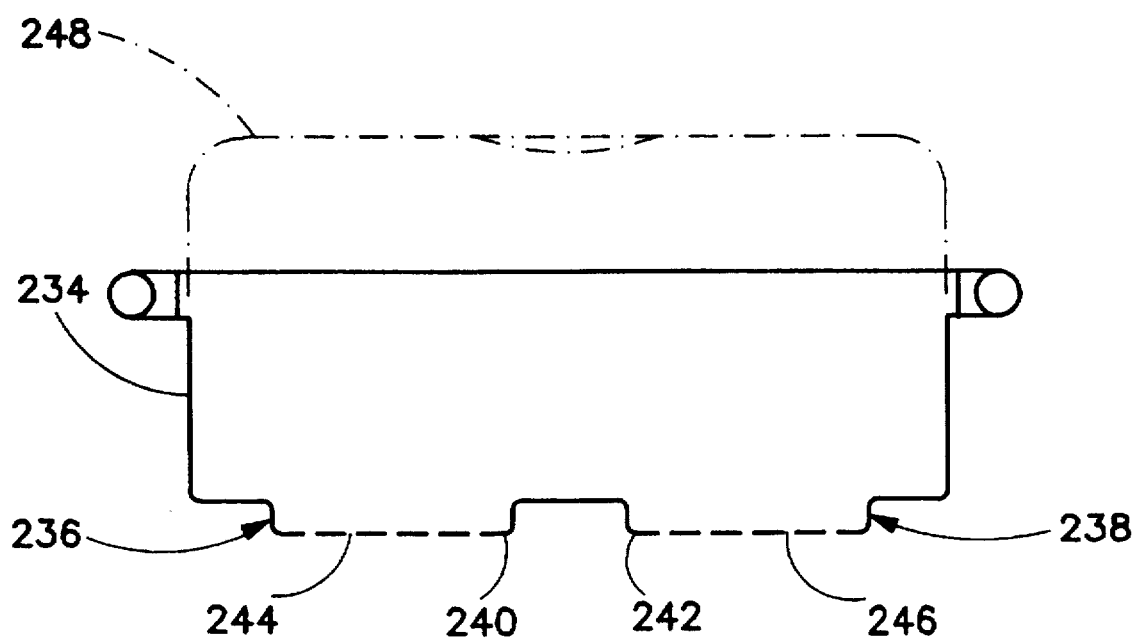

FIG. 23 illustrates a steamer-type pan part 234 connectable to upper pan portion 132 of FIG. 13 so as to essentially cover both of the openings 134 and 136 thereof. Pan part 234 is provided with two elongate projections 236 and 238 insertable in effectively steam-tight fits into openings 134 and 136, respectively. Lower walls or surfaces 240 and 242 of projections 236 and 238 are formed with perforations 244 and 246, respectively. A cover 248 may be provided from forming an enclosed chamber receiving vegetables or other food stuffs to be subjected to a steam cooking process.

Each baking kit part or panel 158, 160, 162, 164, 190, 192, 194, and 234 defines a support surface on which a foodstuff is deposited at the onset of a steaming and/or baking process. When baking kit part 158, 160, 164, 190, 192, or 234 is used, the foodstuff is generally placed over the perforation array(s) provided in the part or panel. After the placement of a predetermined aliquot of water in recesses 144 and 148 (see FIG. 13) and, optionally, the disposition of a flavoring composition in recess 146, baking pan portions 130 and 132 are connected to one another. Two baking pan parts selected from among parts 158, 160, 162, and 164 or a single part selected from among parts 190, 192, and 234 is connected to upper pan portion 132, either before or after the coupling of pan portions 130 and 132. A food item such as a piece of dough is then positioned on an upper surface of the selected panel 158, 160, 162, 164, 190, 192, or 234 so that the dough covers an array of perforations. Supporting the dough on its uppermost surface, the assembled baking pan is then placed into a heated enclosure or oven having a preselected temperature. Subsequently, steam is generated in chamber 154 and escapes through the perforations in the selected panel 158, 160, 162, 164, 190, 192, or 234. The cooking of the foodstuff, particularly dough, proceeds as described in detail above.

The terms "steam-tight" and "steam-proof" are used herein to designate a coupling or seal which is effective to enable the guiding of steam from a steam-generation chamber through perforations in an upper pan portion or panel of a baking pan or kit to the lower surface of a food article placed over the perforations. The fit or coupling between upper and lower pan portions or between a panel and an upper pan portion need not be absolutely tight; there may be some steam leakage around the joints in the baking pan or assembled baking pan kit. However, the leakage is not so large as to prevent the delivery of an effective amount of steam to the lower surface of a food article.

Although the invention has been described in terms of particular embodiments and applications, one of ordinary skill in the art, in light of this teaching, can generate additional embodiments and modifications without departing from the spirit of or exceeding the scope of the claimed invention. For example, previously cooked foodstuffs such as pizza may be reheated by using the method of the present invention. The generation of steam serves to moisten outer and underlying surfaces of a previously cooked food article, thereby reducing, if not eliminating, hardening of the outer surface which frequently occurs on reheating.

Accordingly, it is to be understood that the drawings and descriptions herein are proffered by way of example to facilitate comprehension of the invention and should not be construed to limit the scope thereof

What is claimed is:

1. A baking pan kit for use in cooking different types of food articles having respective lower surfaces with different predetermined sizes and shapes, said baking pan kit comprising:
    a lower pan portion,
    an upper pan portion removably connected to said lower pan portion via an effectively steam-proof seal, said upper pan portion having an upper surface provided with an opening; and
    a plurality of panels alternatively connectable to said upper pan portion over said opening, said upper surface having an area surrounding said opening which is continuous and free of perforations, at least one of said panels being provided with a plurality of perforations disposed in a predetermined array substantially conforming in size and shape to the size and shape of the lower surface of a selected one of the food articles whereby the selected food article covers substantially all of said perforations upon being placed on said one of said panels over said array, said one of said panels being connectable to said upper pan portion in an effectively steam-proof seal to define, with said lower pan portion and said upper pan portion, a substantially sealed chamber, said perforations communicating with said chamber.

2. The baking pan kit of claim 1 wherein said lower pan portion is provided with a recess communicating with said chamber.

3. The baking pan kit of claim 2 wherein said recess is laterally spaced from said array.

4. The baking pan kit of claim 2 wherein at least one of said panels is a solid, continuous or imperforate piece.

5. The baking pan kit of claim 1 wherein said opening is one of a plurality of openings provided in said upper surface of said upper pan portion, said panels including a given panel connectable to said upper pan portion over said openings.

6. The baking pan kit of claim 5 wherein said given panel includes a first array of perforations and a separate second array of perforations, said first array and said second array being alignable with and disposable over respective ones of said openings upon a coupling of said given panel to said upper pan portion.

7. The baking pan kit of claim 6 wherein said given panel is provided with a multiplicity of grooves extending from perforations in said first array to perforations in said second array.

8. The baking pan kit of claim 5 wherein said given panel is a solid, continuous or imperforate piece.

9. The baking pan kit of claim 1 wherein said array is one of a plurality of arrays of perforations provided in said one of said panels, said arrays being spaced from one another.

10. The baking pan kit of claim 1 wherein said one of said panels is provided with sidewalls to thereby form a meat-loaf-type baking pan having a depth and a width and a length, said depth being comparable to said width, said length being substantially greater than said width.

11. The baking pan kit of claim 1 wherein said opening is large enough so that all of said perforations communicate with said chamber via said opening.

12. A cooking method comprising:
    providing a baking pan kit including a lower pan portion, an upper pan portion having an upper surface provided with an opening, and a plurality of panels alternatively connectable to said upper pan portion over said opening, said upper surface having an area surrounding said opening which is continuous and free of perforations, at least one of said panels being provided with a plurality of perforations disposed in a predetermined array;
    assembling said baking pan kit by coupling said upper pan portion to said lower pan portion, disposing a predetermined amount of water in said lower pan portion, and connecting said one of said panels to said upper pan portion over said opening to thereby define a substantially sealed chamber, said perforations communicating with said chamber;
    disposing a food article on said one of said panels so that said food article substantially covers all of said perforations;
    moving the assembled baking pan kit together with said food article on said one of said panels into a heated enclosure;
    after placement of said assembled baking pan kit and said food article in said heated enclosure, generating steam from the water in said chamber and delivering said steam, for a first limited period of time, from said chamber through said perforations to a lower surface of said food article; and
    upon completion of the delivery of steam to said food article, subjecting said food article only to conventional baking for a second limited period of time.

13. The method of claim 12 wherein said lower pan portion is provided with a recess communicating with said chamber, the disposing of said predetermined amount of water in said lower pan portion including depositing said water in said recess.

14. The method of claim 12 wherein said panels include a selected panel in the form of a solid, continuous or imperforate piece, further comprising:
    removing said one of said panels from said upper pan portion and connecting said selected panel to said upper pan portion, thereby forming a reassembled baking pan kit wherein said chamber forms a thermal insulating space;
    placing a further food article on said selected panel; and
    moving the reassembled baking pan kit together with said further food article on said selected panel into an oven.

15. The method of claim 12 wherein said opening is one of a plurality of openings provided in said upper surface of said upper pan portion, said panels including a given panel connectable to said upper pan portion over said openings, further comprising:

removing said one of said panels from said upper pan portion and connecting said given panel to said upper pan portion, thereby forming a reassembled baking pan kit;

placing a further food article on said given panel; and moving the reassembled baking pan kit together with said further food article on said given panel into an oven.

16. The method of claim 15 wherein said given panel includes a first array of perforations and a separate second array of perforations, further comprising disposing said first array and said second array in alignment with and over respective ones of said openings upon a coupling of said given panel to said upper pan portion.

17. The method of claim 12, further comprising placing a flavoring composition into said chamber prior to the moving of said assembled baking pan kit and said food article into said enclosure.

18. The method of claim 12 wherein the disposing of said predetermined amount of water in said lower pan portion is performed prior to the coupling of said upper pan portion to said lower pan portion and prior to the connecting of said one of said panels to said upper pan portion over said opening.

19. The method of claim 12, further comprising subjecting an upper portion of said food article to conventional dry baking heat while steam is applied to a lower portion of said food article during said first limited period of time.

20. The method of claim 12, further comprising subjecting said food article also to baking during said first limited period of time.

21. The method of claim 12 wherein said enclosure is an oven, further comprising preheating said oven prior to placement of said food article into said oven.

22. The method of claim 12 wherein said steam is generated solely by heat in said enclosure.

* * * * *